Aug. 22, 1950     D. R. CORNELL     2,519,548
RAILWAY CAR WHEEL
Filed Jan. 25, 1947

INVENTOR:
DANA R. CORNELL
By
Bertha L. MacGregor
ATTORNEY

Patented Aug. 22, 1950

2,519,548

UNITED STATES PATENT OFFICE 2,519,548

RAILWAY CAR WHEEL

Dana R. Cornell, East Chicago, Ind., assignor to Standard Forgings Corporation, Chicago, Ill., a corporation of Delaware Application January 25, 1947, Serial No. 724,263

3 Claims. (Cl. 295—16)

This invention relates to railway car wheels and to methods of manufacturing them.

The main object of my invention is to produce a railway car wheel embodying an integral hub and web, in which the grain flow lines of the metal extend radially and provide radial flexibility of the web and resistance to fatigue, and in which a separately fabricated rim or tire member is welded to the web in a novel manner hereinafter described.

Preferably the rim or tire is produced by rolling the proper sectional shape in long lengths, cutting to the required circumferential length, forming into a circle of correct diameter and abutting the ends of the length for butt welding. This method of fabricating the tire has the advantage of producing grain flow lines in the metal which extend parallel to the direction of rail contact and thereby increase the durability of the tire. By making the rim separately from the hub and web unit, the rim may be made of metal having an analysis and heat treatment suitable for maximum protection against wear, shelving or other faults in service, and the metal of the rim may differ from that of the integrally formed web and hub member. Thus the web and hub may embody metal of different analysis than the metal of the rim, may be separately toughened by heat treatment, or be of cheaper material than the rim.

To produce the radially extending grain flow lines in the hub and web, inherent in the steel as rolled by the mill, a billet of suitable size is drop forged in a rotating die so that the billet will be upset, and the grain flow lines will extend unbrokenly outwardly in radial directions. This renders the hub and web capable of withstanding severe flexing in use.

Another object of the invention is radially to curve the web prior to mounting the rim thereon, for the purpose of providing resiliency in the web portion without distortion of the metal constituting the web, a result which cannot be attained when the web and rim are integrally formed. This resiliency of the web portion affords a cushioning effect against impact.

Another object is to provide an economical method of manufacture wherein the rim is welded to the web after the hub and web have been integrally forged and the web shaped to predetermined contour, my welding method being such that nice fitting of the rim and web and intricate shaping of the parts after they have been joined, are not required. The weld material is applied to the junction of the web and rim so as to extend continuously circumferentially, adjacent one face and the peripheral edge of the web, and in abutment with a substantial portion of the inner surface of the rim opposite the tread surface.

Wheels have been produced heretofore by welding rims to cast or rolled webs, but these constructions lack the radially extending grain flow lines produced in my method of drop forging the hub and web unit, whereby I retain the characteristic radial grain flow inherent in the upset billet.

While the rim may be forged in the shape of a ring and then welded to the drop forged hub and web unit, I prefer to roll the rim as heretofore stated in order to obtain grain flow lines in the rim which extend longitudinally thereof and parallel to the rail with which it is designed to contact in use.

Figure 1:
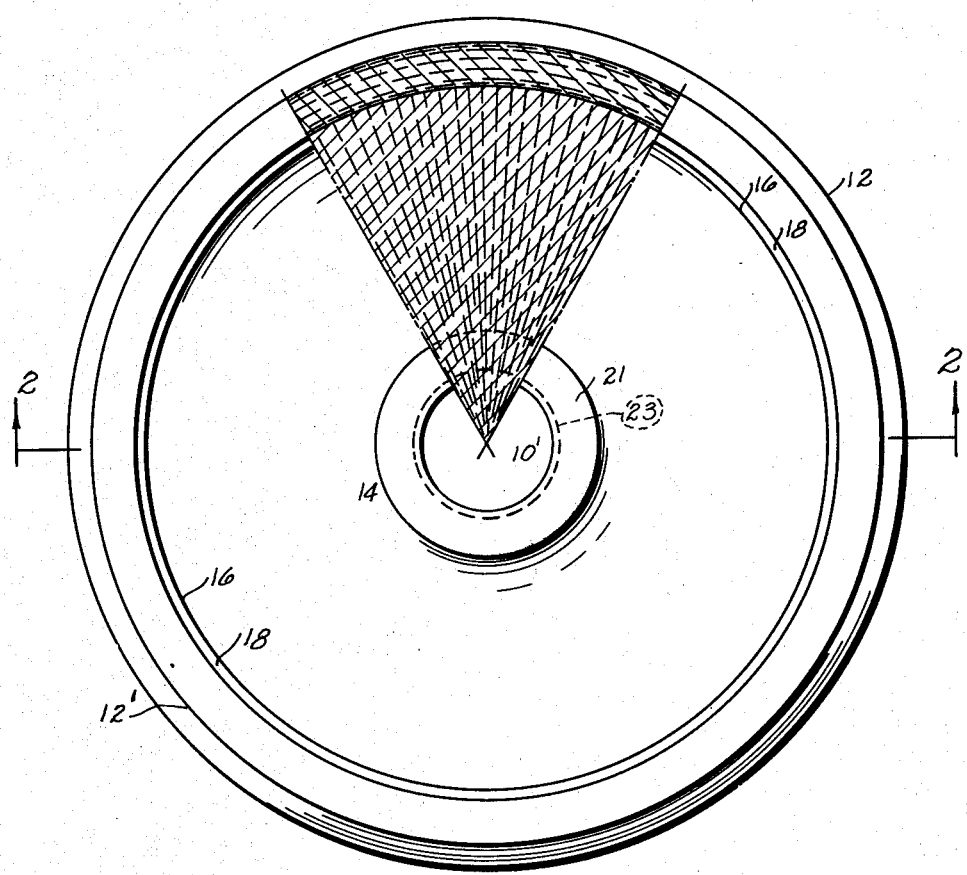
Fig. 1 is an elevational view, partly in section, of the car wheel embodying my invention, the sectional portion showing the radially extending grain flow lines in the hub and web and the circumferentially extending grain flow lines in the tire.

In the preferred embodiment of my invention shown in the drawing, the hub 10 is integral with the web 11, and the grain flow lines of the steel extend from the center of the hub radially to the periphery of the web. As a result of drop forging this unit on a rotatable die, as is well understood in the art, the metal of the central part of the hub and the metal of the web is compacted to a maximum degree and the grain flow lines appear close together and radially unbroken.

The rim is indicated as a whole at 12, and as shown in Fig. 1, the grain flow lines extend longitudinally of the rim, i. e. circumferentially thereof. The rim 12 preferably is produced by rolling a length of heat treated metal of desired analysis for the intended purpose, cutting to provide for proper diameter, forming the length into ring form, and abutting and welding the ends. The rim has a tread surface 12' and a rail abutting flange adjacent one side thereof.

Figure 2:
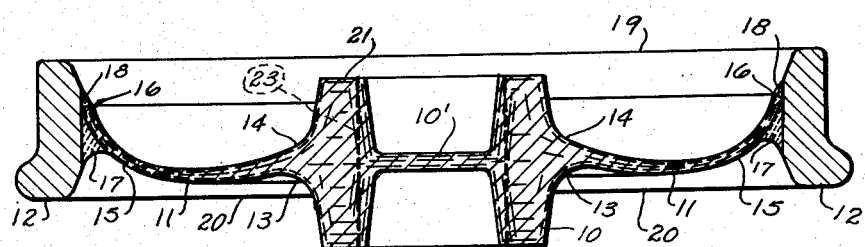
Fig. 2 is a sectional view taken in the plane of the line 2—2 of Fig. 1, looking in the direction indicated by the arrows.

The hub 10, centrally recessed at opposite sides, as shown in Fig. 2, in the forging operation, together with the web 11 and fillets 13 and 14, are forged integrally. The hub is of substantial thickness excepting in the part 10' between the central recesses. The web is forged relatively thin and flat. After the forging has been completed, the web is radially curved or dished in the annular region indicated by the numeral 15. The forming of the web is accomplished after trimming the peripheral portion 16 to desired diameter of the integral hub and web. Since the peripheral trimming is done while the web is relatively flat and before it has been dished, the edge surface 16' extends at substantially a right angle to the faces of the web 11.

Figure 3:
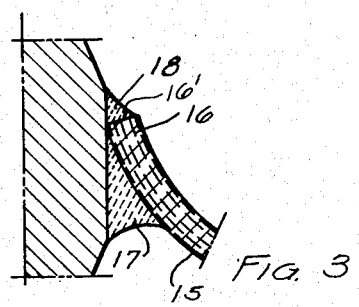
Fig. 3 is an enlarged fragmentary view showing the weld connection between the web and rim.

Opposite the tread 12', there is a flat surface on the inner circumferential side of the rim 12, to which the web 11 is connected by welding material 17 applied between the rim 12 and the convex face of the web, and welding material 18 applied between the rim 12 and the peripheral edge 16' of the web, as shown in Figs. 2 and 3. The weld material extends continuously circumferentially, adjacent said peripheral edge and the convex surface of the web 11, and adheres to the inner circumferential surface of the rim opposite the tread, whereby the rim and web are connected together efficiently and durably without nice fitting of the parts and without detracting from the resiliency and flexibility of the web portion 11. Because of the dished form of the web 11, the convex surface of the web and the inner surface of the rim form an acute angle and substantial surface area for engagement with the weld material.

The relationship of the parts and the radial curve of the web 11 are such that the side surface 19 of the rim, in the operative position of the wheel, lies in a vertical plane located outwardly of the side 21 of the hub 10, and the side surface 20 of the rim lies in a vertical plane located inwardly of the side 22 of the hub 10, as shown in Fig. 2. Thus the finished wheel has a dished appearance from the outside of the railway car, and load is transmitted through the resilient web 11 to the peripheral portion 16 reinforced by the weld material 17 and thence to the rim 12.

The hub 10 is punched or bored as indicated by the dotted line 23, whereby the thin portion 10' of the hub is removed. Usually the punching takes place when the forging of the hub and web has been completed, either before the web is trimmed to desired diameter or simultaneously with the trimming operation. The forging of the hub produces grain flow lines as shown in Figs. 1 and 2, and when the hub is bored the circumferential walls 23 of the bore are located in the compacted region wherein the grain flow lines are parallel with said surface 23 and substantially at right angles to the radially extending grain flow lines in the hub and web. This construction provides a very durable hub and long wearing bearing surface.

Changes may be made in the form and details of construction of the railway car wheel illustrated herein without departing from the scope of my invention as set forth in the appended claims.

I claim:

1. A railway car wheel comprising an integrally forged hub and dished web unit, a separately formed rim, the dished web having a convex side surface and a peripheral end surface at substantially right angles to each other, the circumferential edge formed by the intersection of said web side surface and peripheral end surface providing a single circumferential line of contact with the inner circumferential surface of the rim, and welding material extending continuously circumferentially of the rim and web and filling the spaces between said web side surface and rim and between said web peripheral surface and rim.

2. A railway car wheel comprising an integrally forged hub and dished web unit, a separately formed rim, the dished web being resilient and flexible and having a convex side surface and a peripheral end surface at substantially right angles to each other, the circumferential edge formed by the intersection of said web side surface and peripheral end surface providing a single circumferential line of contact with the inner circumferential surface of the rim, and welding material extending continuously circumferentially of the rim and web and filling the spaces between said web side surface and rim and between said web peripheral surface and rim.

3. A railway car wheel comprising an integral hub and web unit, a separately formed rim, the web having a convex side surface and a peripheral end surface at substantially right angles to each other, the said web surfaces intersecting to form a circumferential edge which provides line contact between the web and rim, and welding material extending continuously circumferentially of the rim and web and filling the spaces between said web side surface and rim and between the said web peripheral surface and rim to said line of contact.

DANA R. CORNELL.

REFERENCES CITED

The following references are of record in the file of this patent:

UNITED STATES PATENTS

| Number | Name | Date |
| --- | --- | --- |
| 887,649 | Kennedy | May 12, 1908 |
| 974,798 | Jacoby et al. | Nov. 8, 1910 |
| 1,684,206 | Smith | Sept. 11, 1928 |
| 1,745,153 | Dalton | Jan. 28, 1930 |
| 1,993,430 | Bell | Mar. 5, 1935 |